(12) United States Patent
Yanaura

(10) Patent No.: US 6,203,363 B1
(45) Date of Patent: Mar. 20, 2001

(54) ELECTRONIC EQUIPMENT WITH REMOVABLE BATTERY TERMINAL

(75) Inventor: Mikio Yanaura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/092,936

(22) Filed: Jun. 1, 1998

(30) Foreign Application Priority Data

Jun. 9, 1997 (JP) .................................................. 9-151030

(51) Int. Cl.[7] .............................. H01R 3/00; H01M 2/10
(52) U.S. Cl. .............................................. 439/500; 429/98
(58) Field of Search .................................... 439/500, 189, 439/502, 504, 506, 507, 509, 511, 513, 131; 429/98, 99, 100

(56) References Cited

U.S. PATENT DOCUMENTS 5,876,242 * 3/1999 Williams ................................ 439/578

* cited by examiner

Primary Examiner—Brian Sircus
Assistant Examiner—Chandrika Prasad
(74) Attorney, Agent, or Firm—Jay H. Maioli

(57) ABSTRACT

A battery terminal case (16) having battery terminals is disposed at an equipment casing (12) of an electronic equipment (11) employing a battery (1) as a power supply therefor so as to be opened and closed. When the battery (1) is used, the battery terminal case (16) is opened and thus a portion (14) where the battery (1) is disposed and connected is formed on an outer portion side of the equipment casing (12). The battery (1) is connected to the battery terminals (18), (19) and thereby electrically connected to the electronic equipment (11). When the battery (1) is not used, the battery terminal case (16) is closed, thereby housing the battery terminals (18), (19) on the side of the equipment casing (12). Therefore, it is possible to employ batteries having different sizes and different capacities as long as each of them has common terminal portions.

11 Claims, 8 Drawing Sheets

ELECTRONIC EQUIPMENT WITH REMOVABLE BATTERY TERMINAL

BACKGROUND OF THE INVENTION

The present invention relates to an electronic equipment employing a battery as a power supply.

An electronic equipment such as a small-sized cassette player, a disk player, a single-unit video camera-recorder, a portable telephone or the like employs a battery as a power supply therefor. A secondary battery which can be repeatedly charged, e.g., a block-shaped battery such as a nickel-cadmium battery package, a lithium battery package or the like is employed as a power supply. A large number of electronic equipments employing batteries as power supplies therefor employ an arrangement in which a battery housing portion having a battery terminal is formed in an equipment casing and a battery is housed in the battery housing portion to be electrically connected to the battery terminal. Some single-unit video camera-recorders are arranged such that a battery terminal is disposed on the side of an outer surface of an equipment casing, particularly on a rear surface side, and a battery is electrically connected to the battery terminal with being engaged and attached to the battery terminal.

Moreover, some electronic equipments are arranged such that a battery housing case is formed independently of an equipment casing and the battery housing case housing a battery is attached to the equipment body when the battery is employed as a power supply.

Since the electronic equipment employing a battery as a power supply therefor and housing the battery in a battery housing portion in its equipment casing uses a block-shaped battery, the electronic equipment has a larger battery housing portion in its equipment casing and consequently the whole casing becomes larger-sized. Additionally, a battery to be used therefor must have a predetermined shape, which prevents batteries having different capacities from being used simultaneously.

An electronic equipment having a battery terminal disposed on the outer surface side of its equipment casing encounters disadvantages that, when a battery is not used, the battery terminal is exposed to the outside, which aggravates an appearance of the electronic equipment and may damage the battery terminal. Moreover, an electronic equipment having a battery housing case formed independently of its equipment casing and attached to the equipment casing when a battery is used, encounters disadvantages that the whole equipment becomes large-sized upon use of the battery, which leads to inconvenience in carrying the electronic equipment and particularly in portability. Also, in this case, a battery to be used therefor must have a predetermined shape, which prevents batteries having different capacities from being used simultaneously.

SUMMARY OF THE INVENTION

In view of such aspects, it is an object of the present invention to provide an electronic equipment which employs a battery as a power supply therefor,in which, when a battery is not employed, an equipment casing can become compact and battery terminals cannot be seen from the outside and which allows the batteries having different capacities to be employed therefor as long as each of them has common terminal portions.

According to a first aspect of the present invention, in an electronic equipment employing a battery as a power source, a battery terminal connected to a battery is disposed so as to be moved into and out of an equipment casing, and when the battery terminal is moved to the outside of the equipment casing, then the battery is connected at the outside of the equipment casing.

According to a second aspect of the present invention, a battery terminal case having the battery terminal is fitted to the equipment casing so as to be drawn therefrom by rotating or sliding the battery terminal case, and when the battery terminal case is projected toward the outside, then the battery is connected at the outside of the equipment casing.

According to a third aspect of the present invention, one terminal of the battery terminal is fixed on the equipment casing, and the other terminal of thereof is fixed on the battery terminal case fitted to the equipment casing so as to be drawn therefrom by rotating or sliding the battery terminal case. When the terminal case is projected toward the outside, then the battery being connected at the outside of the equipment casing.

According to the electronic equipment of the present invention thus arranged, since, when the battery is used, the battery terminal is moved to the outside of the equipment casing and then the battery is disposed and connected, it is possible to employ batteries having different sizes and different capacities as long as each of them has common terminal portions. Since, when the battery is not used, the battery terminal is housed in the equipment casing, the outer appearance of the electronic equipment is improved and the equipment casing thereof can become compact as compared with that of a battery incorporated type electronic equipment.

BRIEF DESCRIPTION OF THE DRAWINGS

FIGS. 8A and 8B are schematic diagrams showing a main part of an electronic equipment according to a second embodiment of the present invention, wherein FIG. 8A is a cross-sectional view of the electronic equipment in a state that a battery terminal case is closed and FIG. 8B is a cross-sectional view thereof in a state that the battery terminal case is opened and then the battery is connected;

FIGS. 9A and 9B are schematic diagrams showing a main part of an electronic equipment according to a third embodiment of the present invention, wherein FIG. 9A is a cross-sectional view of the electronic equipment in a state that a battery terminal case is housed and FIG. 9B is a cross-sectional view thereof in a state that the battery terminal case is brought to the outside and then the battery is connected; and FIGS. 10A and 10B are diagrams showing a main part of an electronic equipment according to a third embodiment of the present invention, wherein FIG. 10A is a cross-sectional view of the electronic equipment in a state that a battery terminal case is housed and FIG. 10B is a cross-sectional view thereof in a state that the battery terminal case is brought to the outside and then the battery is connected.

DESCRIPTION OF THE PREFERRED EMBODIMENTS

An embodiment of the present invention will hereinafter be described with reference to the accompanying drawings.

An electronic equipment according to the first embodiment of the present invention employs as a power supply therefor a battery disposed outside an equipment casing thereof and connected to the electronic equipment.

An electronic equipment employing a block-shaped lithium ion type rechargeable battery shown in FIG. 7 by way of example, i.e., a rechargeable battery pack (hereinafter simply referred to as a battery) 1 as a battery will be described.

Figure 7:
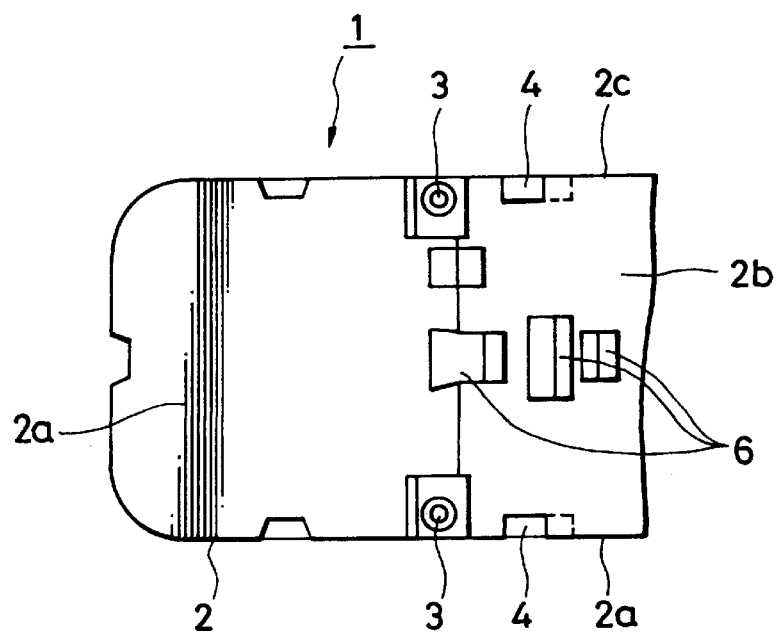
FIG. 7 is a perspective view of an example of a battery.

As shown in FIG. 7, the battery 1 has terminal jacks 3, 3 buried on both sides of a lower end portion on a side of a front surface 2a of a battery body 2. Engagement groove portions 4, 4 are formed at two positions in each of forward and backward directions at corner portions between a lower surface 2b and both side surfaces 2c and 2d. A detection groove 5 is formed between the engagement groove portions 4, 4 on the side of the one side surface 2c, and various detection concave portions 6 are formed on the lower surface 2b.

FIGS. 1 to 6 are diagrams showing a disk player, particularly a CD-video disk player as an electronic equipment. However, an inner arrangement of the disk player is not shown in the above FIGS. 1 to 6 and is not described.

An outer part of a CD-video disk player (hereinafter referred to as an electronic equipment) 11 shown in FIGS. 1 to 6 is formed of an equipment casing 12 incorporating a drive mechanism, a display mechanism and so on and a lid body 13 incorporating an operation mechanism and so on. A disposition and is connection portion 14 is where a battery 1 is disposed and connected to the electronic equipment 11.

The disposition and connection portion 14 is formed of a battery holding portion 15 formed by forming a part from a rear surface side of a rear portion of the equipment casing 12 to an upper surface side thereof as an opening portion, and of a lid-shaped battery terminal case 16 which substantially covers an upper half portion of a part from an upper surface side of an opening portion of the battery holding portion 15 to a rear surface side thereof. Each of the battery holding portion 15 and the battery terminal case 16 is formed so as to have a longitudinal width larger than a length of the battery 1. The battery terminal case 16 is pivotally supported at its both side surface portions through shafts 17 by the battery holding portion 15 so as to be rotatable in the upward and downward direction, in a state that the battery terminal case 16 is moved upward to be opened, so that an interval between an upper-side inner surface of the battery terminal case 16 and a bottom surface of the battery holding portion 15, i.e., an interval between respective portions displaced away from end edge portions thereof should be substantially equal to a width of the battery 1.

The battery terminal case 16 is rotatably held by the battery holding portion 15 so as to be stopped with a click at an upper position relative to the battery holding portion 15 where it is stopped after it is rotated so as to be opened and at a lower position relative thereto where it is stopped after it is rotated so as to be closed. At the upper position where it is stopped after it is rotated so as to be opened, the battery terminal case 16 is projected from a rear-portion upper surface side of the equipment casing 12. At the lower position where it is stopped after it is rotated so as to be closed, the battery terminal case 16 is positioned at a rear portion of the equipment casing 12 along its part from the upper surface side to the rear surface side.

Battery terminals 18, 19 are disposed on respective one side surface sides i.e., on respective inner side portions opposed to a front surface of the battery 1, of the battery holding portion 15, thus formed and the battery terminal case 16 thus formed. The battery terminals 18, 19 are positioned so as to be opposed to terminal jacks 3, 3 of the battery 1 in a state that the battery terminal case 16 is rotated upward relative to the battery holding case 15 so as to be opened. The battery terminal 19 disposed on the side of the battery terminal case 16 is disposed on the inner side of the rear surface portion (which is located on the upper surface side in a state the battery terminal case 16 is rotated upward so as to be opened) of the battery terminal case 16.

Figure 1:
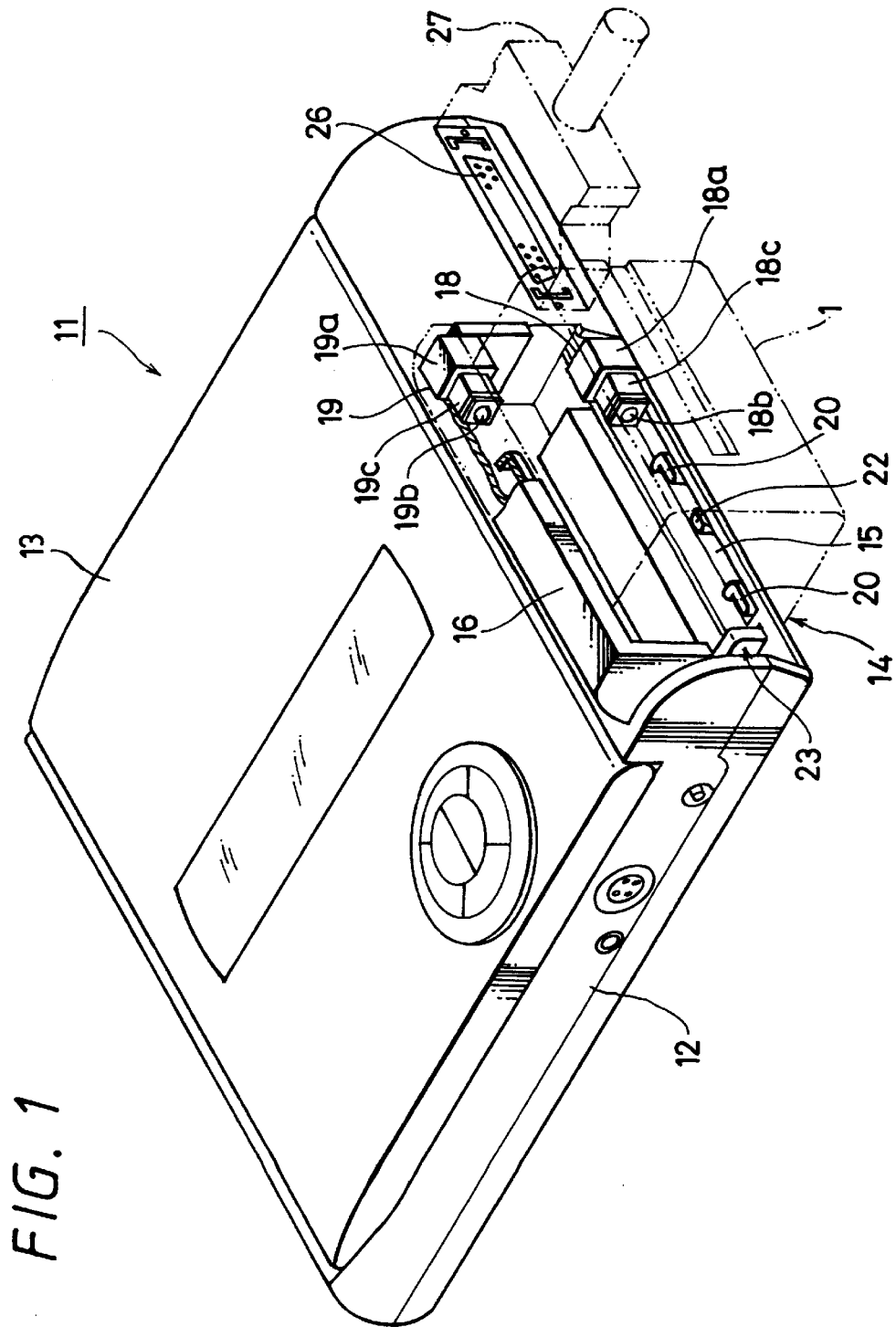
FIG. 1 is a perspective, partially broken view of a disk player as an example of an electronic equipment according to the present invention.
Figure 2:
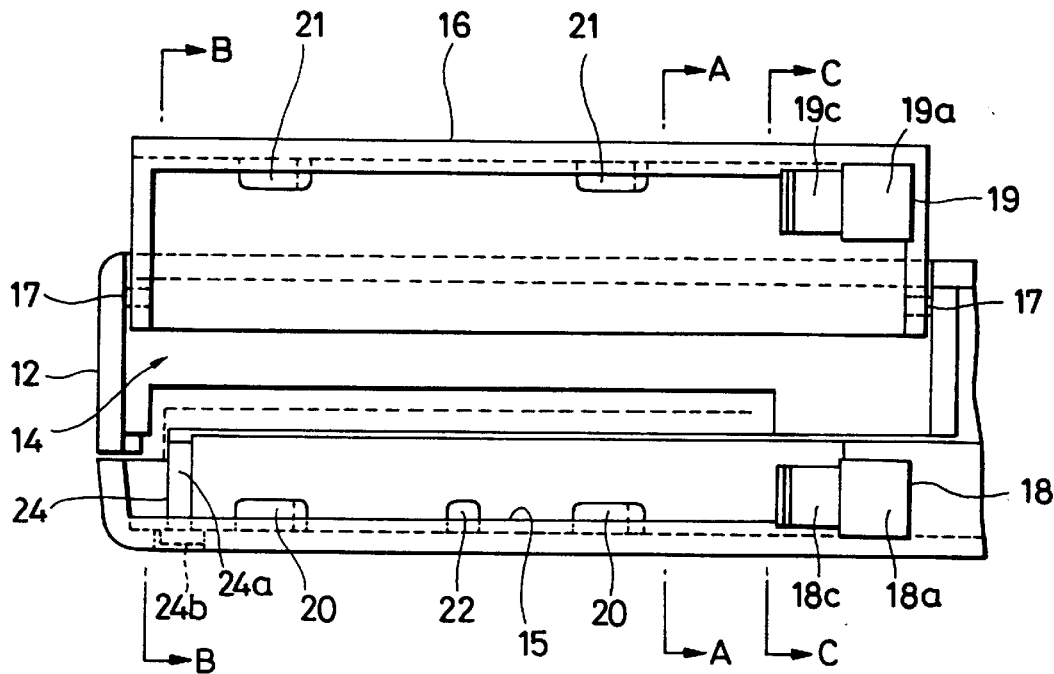
FIG. 2 is a rear view of the disk player shown in FIG. 1 in a state that a battery terminal case of a portion thereof where a battery is disposed and connected is opened to connect the battery.
Figure 3:
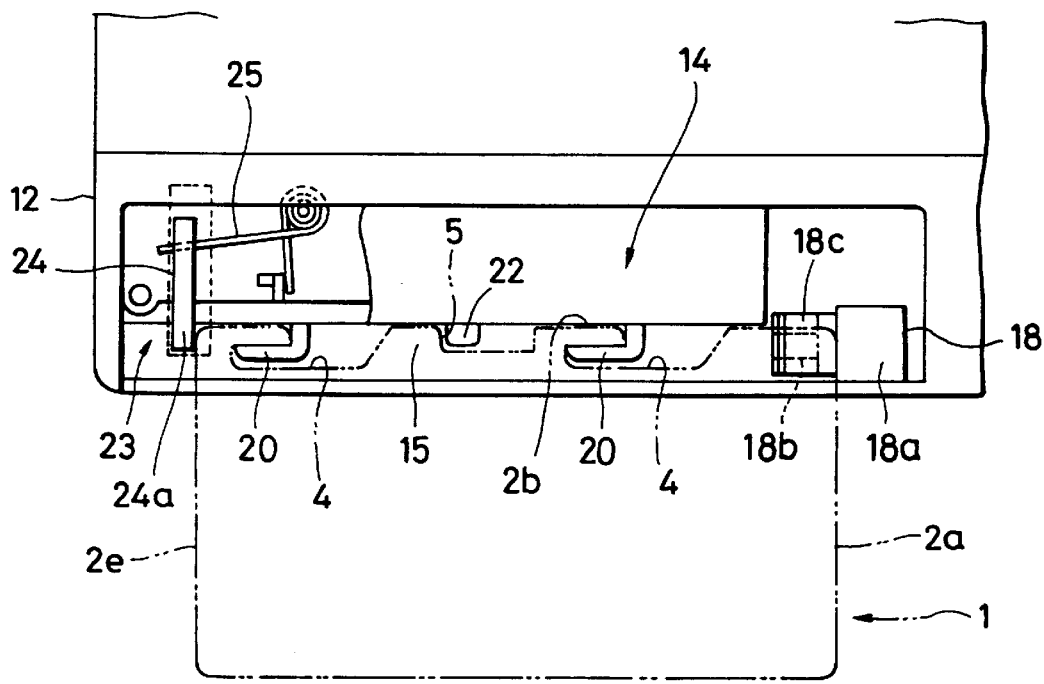
FIG. 3 is a plan view of the disk player in a state that the battery terminal case of the battery connection portion shown in FIG. 2 is detached.
Figure 4:
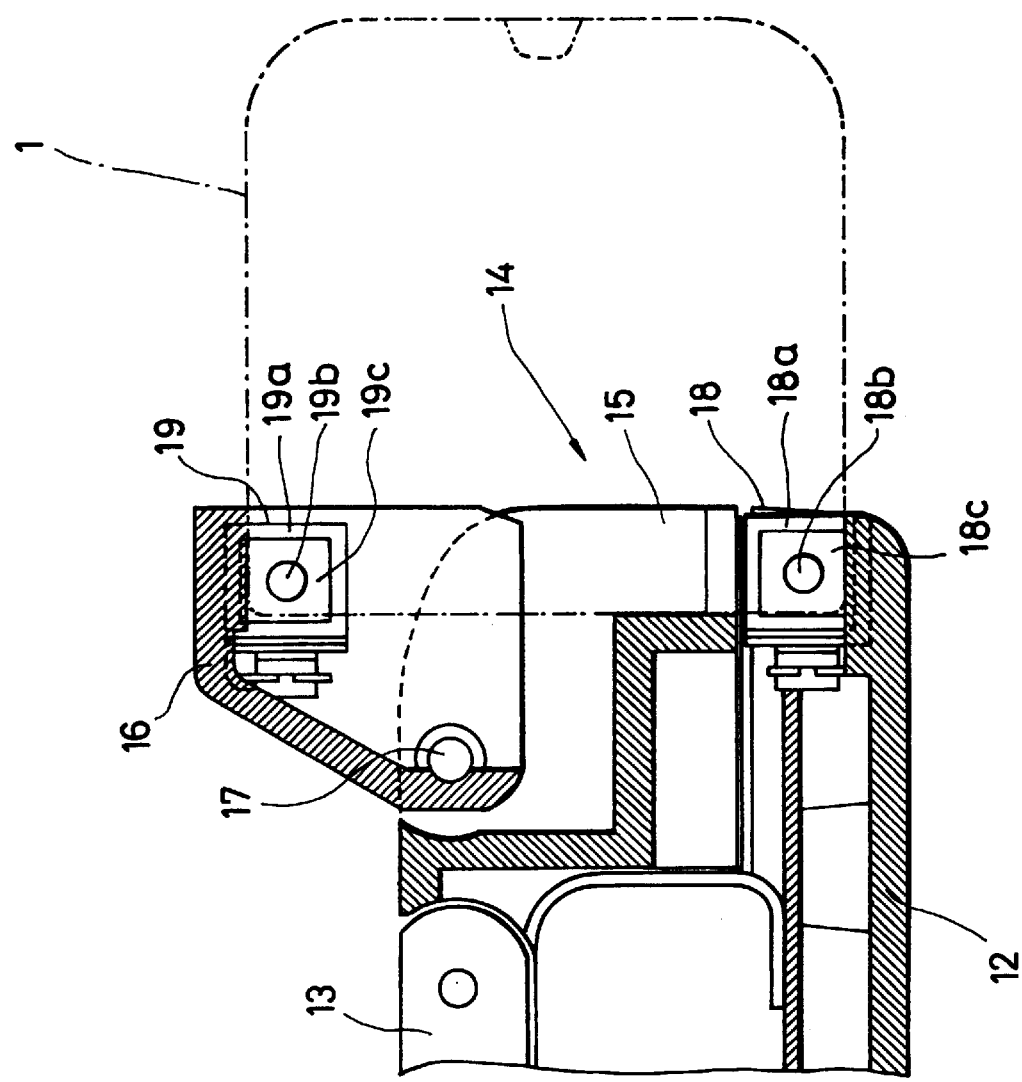
FIG. 4 is a cross-sectional view of the disk player shown in FIG. 1 cut along a line A—A in FIG. 2.
Figure 5:
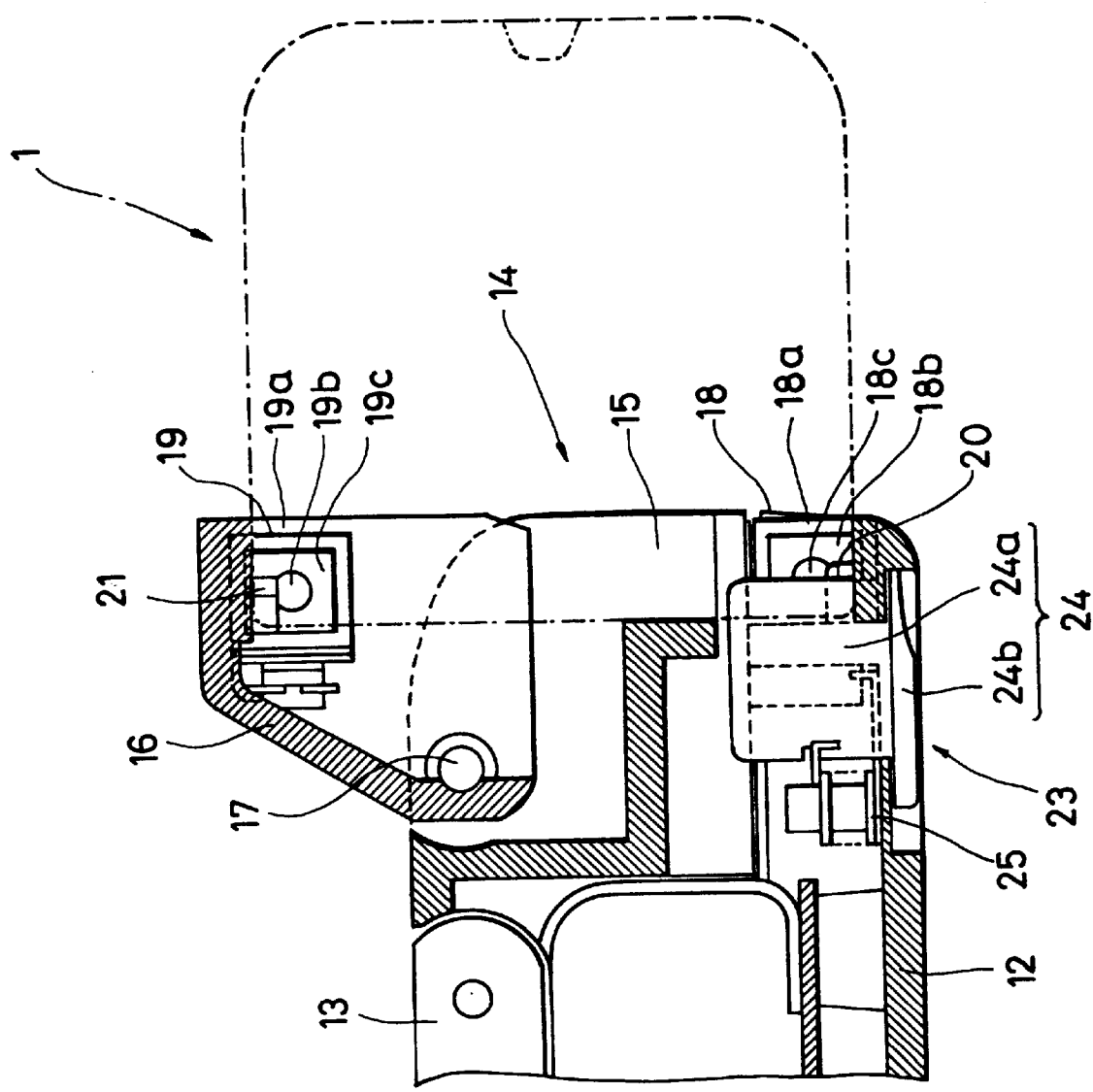
FIG. 5 is a cross-sectional view of the disk player shown in FIG. 1 cut along a line B—B in FIG. 2.
Figure 6:
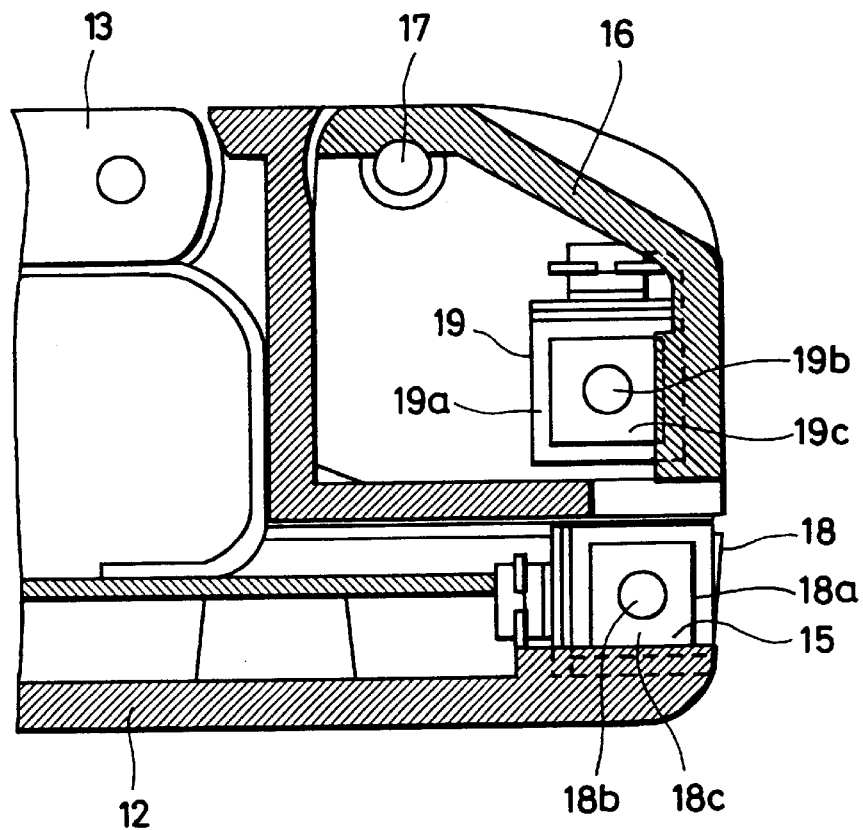
FIG. 6 is an enlarged, cross-sectional view of the disk player shown in FIG. 1 cut along a line C—C in FIG. 2 in a state that the battery terminal case of the battery connection portion shown in FIG. 2 is closed.

Substantially L-shaped engagement projections 20, 21 engaged with the engagement groove portions 4, 4 of the battery 1 are projectingly provided on a lower surface of the battery holding portion 15 and an inner surface of the rear surface portion of the battery terminal case 16. A detection projection 22 to be inserted into a detection groove 5 of the battery 1 is projected between the engagement projections 20, 20 on the lower surface portion of the battery holding portion 15. As shown in FIGS. 3 and 5, a battery stopper mechanism 23 for preventing the battery 1 from being detached from the electronic equipment 11 is provided on the bottom surface portion of the battery holding portion 15. The battery stopper mechanism 23 is positioned on the side opposed to the battery terminal 18 and stops the batteries 1 in a state that the battery 1 is connected to the battery terminals 18, 19 through the terminal jacks 3, 3 and the engagement groove portions 4, 4 are engaged with the engagement projections 20, 21. This battery stopper mechanism 23 is formed of a stopper member 24 and a torsion spring 25 serving as a springy biasing member. The stopper member 24 has a vertical stopper plate portion 24a and a horizontal operation piece portion 24b provided at a lower edge thereof. The stopper plate portion 24a of the stopper member 24 is projected over the bottom portion of the battery holding portion 15, and the operation piece portion 24b is opposed to a lower surface side of the equipment casing 12 and disposed so as to be slidably moved in the forward and backward direction, i.e., the inward and outward direction of the battery holding portion 15. The operation piece portion 24b is biased by a spring force of the torsion spring 25 in the backward direction, toward the rear surface of the battery holding portion 15.

The battery terminals 18, 19 respectively have terminal mounts 18a, 19a having terminals connected to leads of a power supply circuit (not shown), terminal pins 18b, 19b projectingly provided the terminal mounts 18a, 19a so as to be inserted thereinto and projected therefrom, and shutters 18c, 19c biased by spring forces in the direction in which the pins 18b, 19b are projected for covering the pins 18b, 19b.

A pin connector 26 connected to other electronic equipments is disposed adjacent to the portion 14 where the battery 1 is located and connected on the rear surface side of the equipment casing 12 of the electronic equipment 11. A connector 27 is connected to the pin connector 26.

When the electronic equipment 11 thus arranged employs a battery as a power supply therefor, the battery terminal case 16 of the portion 14 where the battery 1 is located and connected is rotated upward around the shafts 17, 17 so as to be opened. In its opened state, the battery 1 is inserted from the lower surface 2b side between the battery holding portion 15 and the battery terminal case 16 so that the terminal jacks 3, 3 should correspond to the battery terminals 18, 19, thereby the engagement groove portions 4, 4 corresponding to the engagement projections 20, 21. When the battery 1 is inserted, the lower surface 2b of the battery 1 collides with and presses the rear end surface of the stopper plate portion 24a and consequently the stopper member 24 of the battery stopper mechanism 23 is slidably moved forward, i.e., inward against the springy biasing force of the torsion spring 25.

If the battery 1 is pressed in the direction toward the battery terminals 18, 19 in a state that the battery 1 is inserted between the battery holding portion 15 and the battery terminal case 16, the lower portion surface of the front surface 2a of the battery 1, i.e., peripheral inner portions of the terminal jacks 3, 3 thereof press the respective shutters 18c, 19c of the battery terminals 18, 19 against the springy force to project the shutters 18c, 19c. Then, the terminals pins 18b, 19b are inserted into the terminal jacks 3, 3 in their exposed states and consequently the battery 1 is connected to the battery terminals 18, 19, thereby the electronic equipment 11 being electrically connected to the battery 1. In this state, the engagement groove portions 4, 4 of the battery 1 are engaged with the engagement projections 20, 21, and the stopper member 24 of the battery stopper mechanism 23 is slidably moved backward, i.e., outward by the springy biasing force of the torsion spring 25, thereby the stopper plate portion 24a being opposed to the lower portion surface of the rear surface 2e of the battery 1. Thus, the battery 1 stably held without being unnecessarily detached from the battery holding portion 15 and the battery terminal case 16, and then can be employed as a power supply of the electronic equipment 11.

Thus, the battery 1 is disposed as and connected to the outer portion of the equipment casing 12 of the electronic equipment 11 without being inserted into and housed in the equipment casing 12.

When the battery 1 disposed in and connected to the electronic equipment 11 is detached from the electronic equipment 11, the stopper member 24 of the battery stopper mechanism 23 is pressed by hooking the operation piece portion 24b opposed to the lower surface side of the equipment casing 12 with the finger. Then, the stopper member 24 is moved toward the inner side of the battery holding portion 15 to detach the stopper plate portion 24a from the rear surface 2e of the battery 1. In this state, the battery 1 is moved in the direction in which the battery 1 is detached from the battery terminals 18, 19. Then, the terminal jacks 3, 3 thereof is detached from the terminal pins 18b, 19b, and the engagement of the engagement groove portions 4, 4 with the engagement projections 20, 21 is released. Thus, the battery 1 can be ejected from the portion between the battery holding portion 15 and the battery terminal case 16.

The stopper member 24 of the battery stopper mechanism 23 is returned by the springy biasing force of the torsion spring 25 when a user stops pushing the operation piece portion 24b with the finger.

After the battery 1 is thus removed from the portion where the battery 1 is located and connected, the battery terminal case 16 is rotated downward, i.e., rotated around the shafts 17, 17 so as to fall down to cover the battery holding portion 15, and the outer surface side of the battery terminal case 16 serves as a portion from the upper surface of the rear portion of the equipment casing 12 to the rear surface thereof. Then, the battery terminal case 16 becomes integral with the equipment casing 12. Then, the battery terminal 19 fitted to the battery terminal case 16 is housed in the equipment casting 12 and hence cannot be seen from the outside.

When the electronic equipment 11 thus arranged employs the battery 1 as a power supply therefor, it is possible, only by rotating the battery terminal case 16 to open the battery terminal case 16 relative to the battery holding portion 15 of the portion 14 where the battery 1 is disposed and connected, to expose the battery terminals 18, 19 and to hold and connect the battery 1 to electrically connect the battery 1 to the power supply circuit in the equipment casing 12.

In this case, since the battery is disposed at and connected to the outer side of the equipment casing 12, i.e., is of a so-called external attachment type, it is possible to use the batteries having different sizes and different capacities as long as each of the batteries have the common terminal portions, i.e., the common terminal jacks 3, 3.

When the battery 1 is not employed, the battery terminal case 16 is closed and housed in the equipment 12 in a state that the battery terminals 18, 19 are located at a narrower interval. Therefore, the equipment casing 12 can be made smaller-sized and thinner as compared with a battery incorporated type electronic equipment, which can downsize the whole electronic equipment 11. Moreover, the battery terminals 18, 19 are covered with the battery terminal case 16, which prevents the battery terminals 18, 19 from being seen from the outside and hence enables the electronic equipment 11 to have the more satisfactory appearance.

An electronic equipment according to the second to fourth embodiments of the present invention will be described with reference to FIGS. 8 to 10 which are schematic diagrams.

Figure 8A:
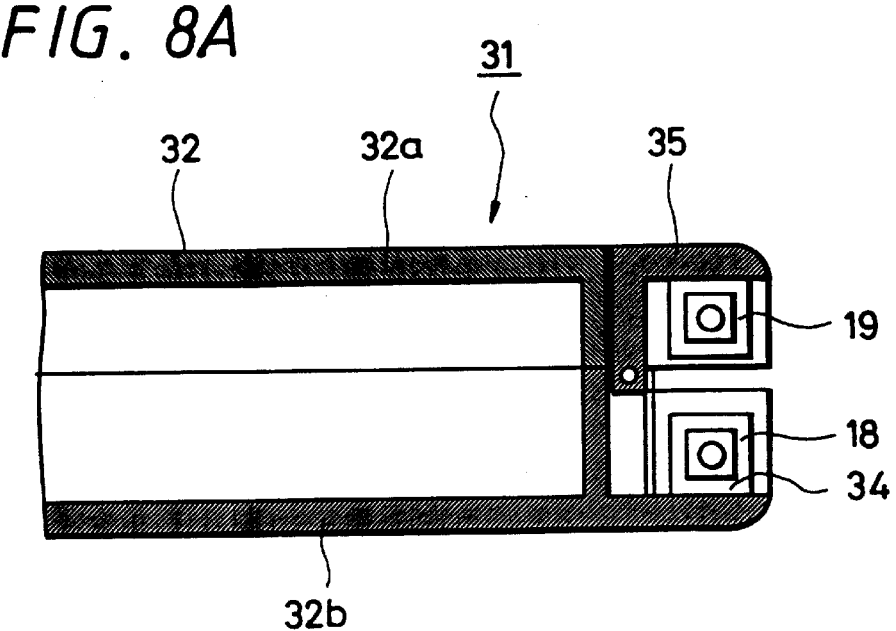
Figure 8B:
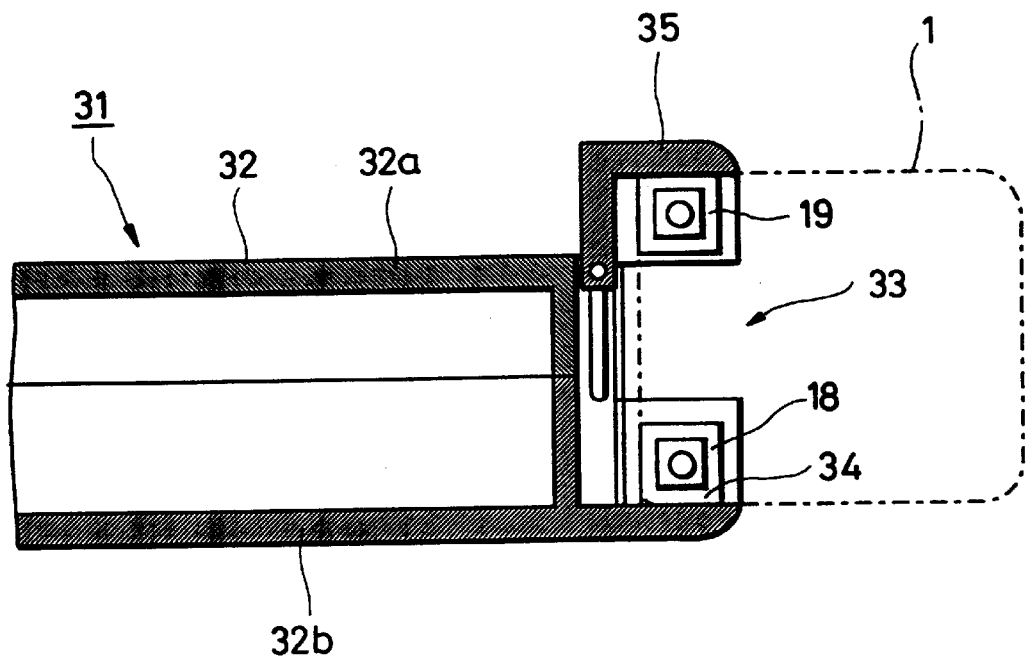

An electronic equipment 31 according to the second embodiment shown in FIGS. 8A and 8B has an upper casing 32a and a lower casing 32b into which an equipment body 32 is divided. A portion 33 where a battery 1 is located and connected is provided at a rear portion of the equipment casing 32. The portion where the battery 1 is located and connected is formed of a battery holding portion 34 integrally formed on the side of a lower casing 32b of the equipment casing 32 and of a battery terminal case 35 disposed so as to be slidable in the vertical direction relative to the battery holding portion 34.

Battery terminals 18, 19 similar to the battery terminals of the electronic equipment 11 are fixed on an inner surface of one side portion of the battery terminal case 35. Similarly to the above electronic equipment 11, engagement projections engaged with engagement groove portions of the battery 1 are formed by the battery holding portion 34 and the battery terminal case 35, but it is not shown in the drawings and will not be described. Moreover, a battery stopper mechanism is provided in the battery holding portion 34 but it is not shown in the drawings and will not be described.

When the battery 1 is located at and connected to the electronic equipment 31 thus arranged, the battery terminal case 35 of the portion 33 where the battery 1 is located and connected is slidably moved upward relative to the battery holding portion 34, thereby the battery terminals 18, 19 being set so as to have an interval therebetween similar to an interval between terminals of the battery 1. In this state, similarly to the first embodiment, the battery 1 is inserted into a space between the battery holding portion 34 and the battery terminal case 35 and then pushed toward the battery terminals 18, 19. Thus, terminal portions thereof are inserted into and connected to the battery terminals 18, 19, thereby the battery 1 being electrically connected to a power supply circuit in the equipment casing 32 of the electronic equipment 31.

As described above, the battery 1 is located at and connected to the outer portion side of the equipment casing 32 of the electronic equipment 31. When the battery 1 is not employed as a power supply, the battery 1 is removed from the space between the battery holding portion 34 of the portion 33 and the battery terminal case 35, and the battery terminal case 35 is slidably moved in the direction toward the battery holding portion 34 to be positioned on the same surface as that of the upper casing 32a of the equipment casing 32. In this state, the battery terminals 18, 19 are opposed to each other at a narrower interval.

Since, similarly to the electronic equipment 11, the battery 1 is located at and connected to the outer portion side of the electronic equipment 31 thus arranged, it is possible to employ batteries having different sizes and different capacities as long as each of them has common terminal portions.

If the battery 1 is not employed, then the battery terminal case 35 is slidably moved in the direction in which the battery terminal case 35 is brought close to the battery holding portion 34 and then positioned at the same surface as that of the equipment casing 32. Therefore, as compared with a battery incorporated type electronic equipment, the equipment casing 32 is made smaller-sized and thinner, which downsizes the whole electronic equipment 31. Moreover, since the battery terminals 18, 19 are brought close to each other, it becomes difficult to see the battery terminals 18, 19, which improves the appearance of the electronic equipment 31.

An electronic equipment according to the third embodiment of the present invention has a pair of battery terminals provided in a battery terminal case.

Figure 9A:
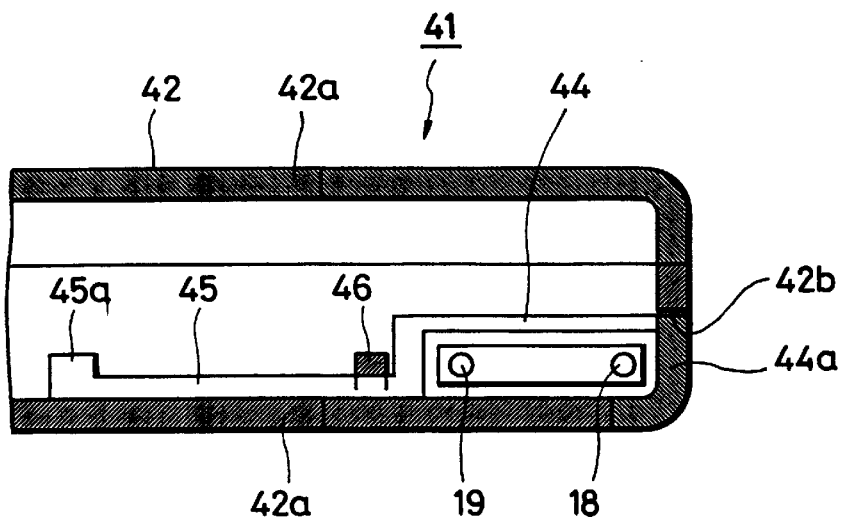
Figure 9B:
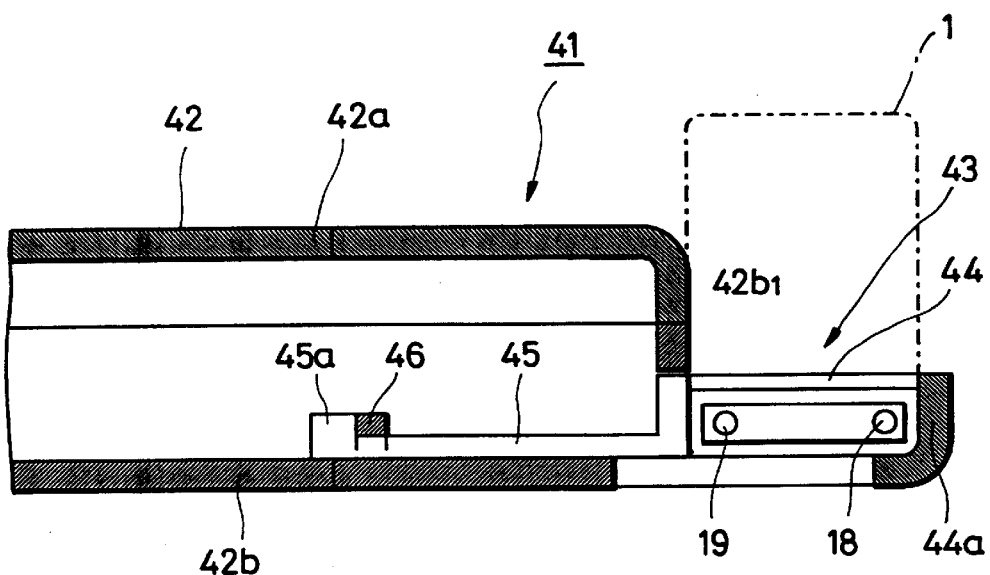
Figure 10A:
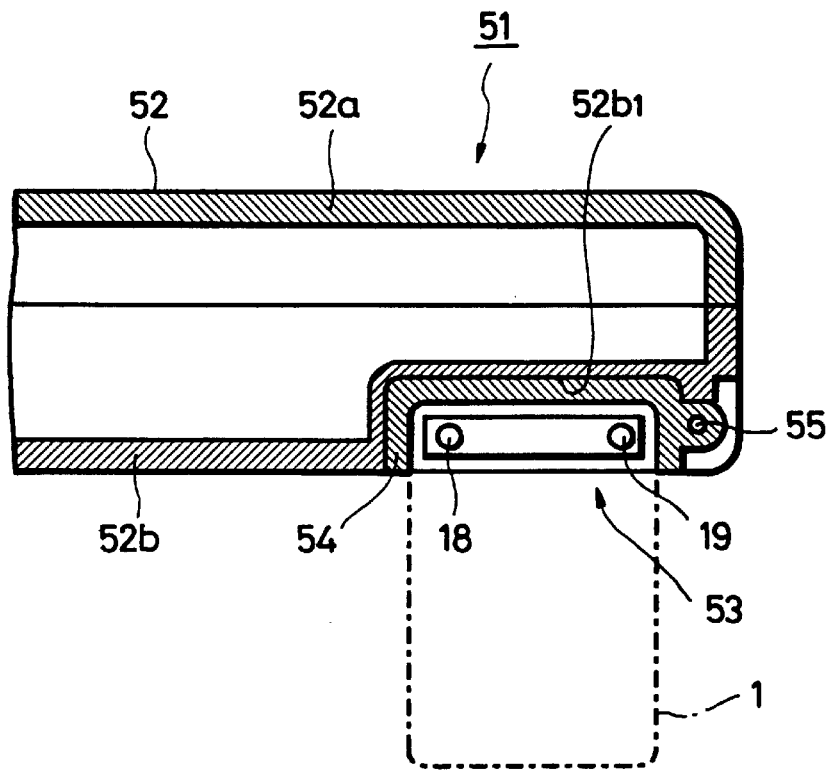
Figure 10B:
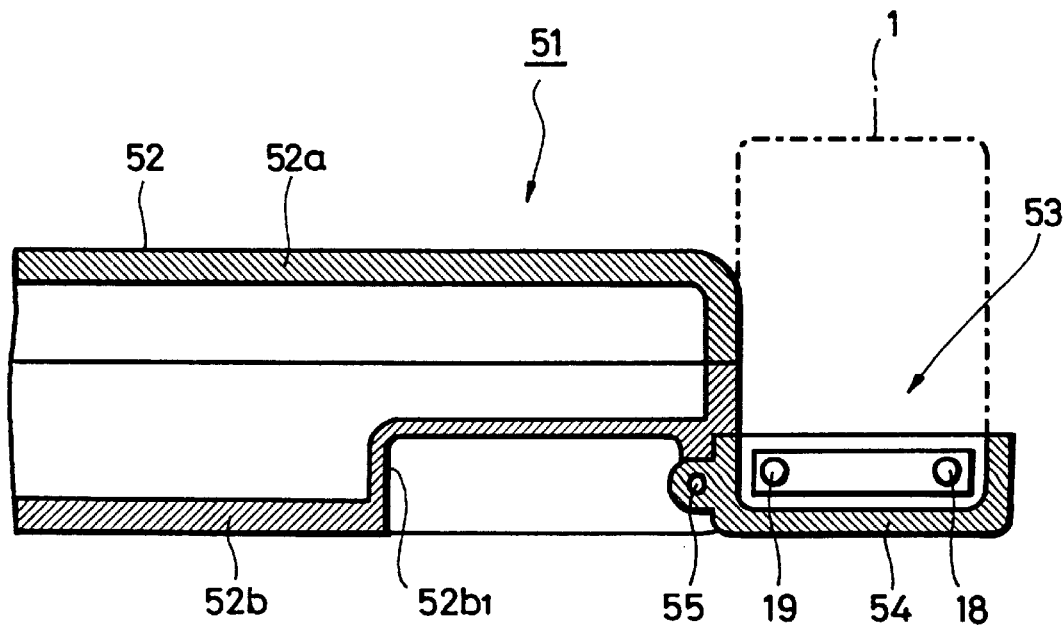

Specifically, similarly to the electronic equipment 31 shown in FIGS. 8A and 8B, an electronic equipment shown in FIGS. 9A and 9B is formed of an upper casing 42a and a lower casing 42b into which the equipment casing 42 is divided. A portion 43 where the battery 1 is located and connected is formed at a rear portion of the equipment casing 42. The portion 43 where the battery 1 is located and connected is disposed so as to be slidably moved out of and into the equipment casing 42 through an opening portion $42b_1$ formed through a rear surface portion of the lower casing 42b, and a pair of battery terminals 18, 19 are fixed on one portion side of the battery terminal case 44.

The battery terminal case 44 has an outer side surface 44 shaped so as to be matched with the opening portion $42b_1$ formed at a portion from a lower half portion side of the rear surface side of the lower casing 42b of the equipment casing 42 to a rear end portion of a bottom surface portion thereof. A supporting arm portion 45 extended toward an inner side of the lower casing 42b is formed on the inner side surface 42b. The supporting arm portion 45 is slidably inserted into a guide supporting frame 46 formed on a bottom surface of the lower casing 42b, which allows the battery terminal case 44 to be fitted so as to be freely moved into and out of the equipment casing 42 in the horizontal direction. A projecting edge portion 45a to be engaged with the guide supporting frame 46 is formed at an end portion of the supporting arm portion 45, and serves to prevent the battery terminal case 44 from being detached in a state that the battery terminal case 44 is fully drawn out of the equipment casing 42.

When the battery 1 is disposed at and connected to the electronic equipment 41 thus arranged, the battery terminal case 44 of the portion 43 where the battery 1 is disposed and connected is drawn from the equipment casing 42 to expose the battery terminal 18, 19 to the outside. In this state, the battery 1 is inserted with its lower surface facing forward so as to be mounted on the battery terminal case 44. Then, the battery 1 is pushed in the direction toward the battery terminals 18, 19 to insert and connect the terminal portions thereof into and to the battery terminals 18, 19. Thus, the battery 1 is electrically connected to a power supply circuit in the equipment casing 42.

As described above, the battery 1 is disposed and connected to an outer portion side of the equipment casing 42 of the electronic equipment 41. When the battery 1 is not employed as a power supply, the battery 1 is detached from the battery terminal case 44 of the portion 43 where the battery 1 is disposed and connected, the battery terminal case 44 is slidably inserted into the lower casing 42b of the equipment casing 42 and the outer side surface 44a thereof is engaged with the opening portion $42b_1$ of the lower casing 42b. Thus, since the battery terminal case 44 is inserted into and housed in the lower casing 42b, the battery terminal case 44 becomes integral with the lower casing 42b in a state that the outer side surface 44a closes the opening portion $42b_1$ a of the lower casing 42b.

Since the battery is disposed at and connected to the outer portion side of the equipment casing 42 also in the electronic equipment 41 thus formed, it is possible to employ batteries having different sizes and different capacities as long as each of them has common terminal portions.

Since, when the battery 1 is not used, the battery terminal case 44 is inserted into and housed in the equipment casing 42, as compared with a battery incorporated type electronic equipment, the equipment casing 42 is made smaller-sized and thinner, which allows the whole electronic equipment 41 to be downsized. Moreover, since at this time the battery terminals 18, 19 are housed in the equipment casing 42 integrally with the battery terminal 44 and completely covered, an appearance of the electronic equipment is improved.

Similarly to the electronic equipment 41 shown in FIGS. 9A and 9B, an electronic equipment 51 shown in FIG. 10 has an equipment casing 52 formed of an upper casing 52a and a lower casing 52b into which the equipment casing 52 is divided. A portion 53 where a battery 1 is disposed and connected is formed at a rear portion of the equipment casing 52. The portion 53 where the battery 1 is disposed and connected is arranged such that a battery terminal case 54 is housed in a housing concave portion $52b_1$ formed at a rear-portion lower surface of the lower casing 52b rotated therefrom and such that a pair of battery terminals 18, 19 are fixed on one side portion side of the battery terminal case 54.

The battery terminal case 54 is formed so as to be dish-shaped and have a size which permits the battery 1 to be inserted so as to be movable in the direction in which the battery 1 is brought close to and away from the battery terminals 18, 19. The housing concave portion $52b_1$ provided on the rear portion lower surface side of the lower casing 52b of the equipment casing 52 is formed so as to have a size which permits the battery terminal case 54 be engaged therewith. The battery terminal case 54 is rotated downward and then engaged with and housed in the housing concave portion $52b_1$.

The battery terminal case 54 is pivotally supported by a shaft 55 at a rear portion of the lower casing 52b and rotated in the horizontal direction toward a rear surface side of the lower casing 52b from the housing concave portion $52b_1$, then being projected in a state such that it faces upward. The battery terminal case 54 is held and stopped by a click at its position where it is projected after rotation and its housed position.

While the battery 1 may be disposed at and connected to the electronic equipment 51 having the above arrangement in a state that the battery terminal case 54 is engaged with and housed in the housing concave portion $52b_1$ of the equipment casing 52, the battery 1 is usually connected to the electronic equipment 51 in a state the battery terminal case 54 is projected from the equipment casing 52 after horizontal rotation. When the battery 1 is connected to the electronic equipment 51, similarly to the electronic equipment 41 shown in FIGS. 9A and 9B, the battery 1 is inserted into the battery terminal case 54 with its lower surface side facing downward. Then, the battery 1 is pushed in the direction toward the battery terminals 18, 19, and terminal portions thereof is inserted into and connected to the battery terminals 18, 19. Thus, the battery 1 is electrically connected to a power supply circuit in the equipment casing 52.

Thus, the battery 1 is disposed at and connected to the outer portion side of the equipment casing 52 of the electronic equipment 51. When the battery 1 is not employed as a power supply, the battery 1 is detached from the battery terminal case 54 of the portion 53 where the battery 1 is disposed and connected. Then, the battery terminal case 54 is rotated downward, and then engaged with and housed in the housing concave portion 52b₁ on the lower surface side of the equipment casing 52, i.e., on the lower surface of the lower casing 52b. As described above, the battery terminal case 54 is housed in the lower surface side of the equipment casing 52 and hence becomes integral with the equipment casing 52.

Since the battery 1 is disposed at and connected to an outer portion side of the equipment casing 52 of the electronic equipment 51 thus arranged, it is possible to use batteries having different sizes and different capacities as long as each of them has common terminal portions.

When the battery 1 is not employed, the battery terminal case 54 is housed in the lower surface side of the equipment casing 52. Therefore, as compared with a battery incorporated type electronic equipment, the equipment casing 54 is made smaller-sized and thinner, which downsizes the whole electronic equipment 51. Moreover, since the battery terminals 18, 19 are housed in the lower surface side of the equipment casing 52 together with the battery terminal case 54, the battery terminals 18, 19 are covered, which improves the appearance of the electronic equipment 51.

The battery 1 and the battery terminals 18, 19 employed in each of the electronic equipments 41, 51 respectively shown in FIGS. 9A, 9B and 10A, 10B are similar to the battery 1 and the battery terminals employed in the electronic equipment 11.

In each of the electronic equipments 11, 31, 41 and 51, the portions 14, 33, 43 and 53 where the battery 1 is disposed and connected may be formed on respective side surface portions of the equipment casings 12, 32, 42 and 52 as well as the rear surface portions thereof. The battery 1 may have other arrangements. If the battery has other arrangement, then the arrangements of the battery terminals 18, 19, the engagement projections 20 and so on must be changed in accordance with the change of the battery 1. Shapes of the battery terminal cases 16, 34, 44, and 54 are changed in accordance with the shape of the battery 1, and their outer appearances are changed in accordance with the shapes of the equipment casings 12, 32, 42 and 52.

The present invention can be applied to various electronic equipments employing batteries as power sources therefor.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An electronic equipment having a casing with an interior and an exterior and employing a battery as a power supply therefor, comprising:
    a battery terminal for connection to the battery and disposed so as to be moved into and out of the interior of said equipment casing, wherein when said battery terminal is moved to the exterior of said equipment casing, said battery is connected to said battery terminal and is arranged at the exterior of said equipment casing;
    a battery terminal case having said battery terminal formed thereon and being fitted to said equipment casing so as to be drawn therefrom by one of rotating and sliding movement of said battery terminal case, and wherein when said battery terminal case is drawn toward the exterior of said equipment casing, said battery is connected to said battery terminal and is arranged at the exterior of said equipment casing.

2. An electronic equipment, having a casing with an interior and and exterior and employing a battery as a power supply therefor, comprising:
    a battery terminal for connection to the battery and disposed so as to be moved into and out of the interior of said equipment casing, wherein when said battery terminal is moved to the exterior of said equipment casing, said battery is connected to said battery terminal and is arranged at the exterior of said equipment casing, whererin said battery terminal forms a first terminal and further comprising a second terminal fixed on said equipment casing and a battery terminal case having said first terminal fixed thereon and being fitted to said equipment casing so as to be drawn therefrom by rotating or sliding said battery terminal case and wherein when said battery terminal case is drawn toward the exterior of said equipment casing, said battery is connected to said first and second terminals and is arranged at the exterior of said equipment casing.

3. The electronic equipment according to claim 2, wherein when the battery is connected to said electronic equipment, said battery terminal case is moved relative to a battery holding portion of said casing, thereby defining an interval between first and second terminals corresponding to an interval between respective terminals of the battery.

4. The electronic equipment according to claim 3, wherein said battery terminal case is rotated relative to a battery holding portion formed in said casing, thereby defining an interval between said first and second terminals corresponding to an interval betweem respective terminals of the battery.

5. The electronic equipment according to claim 2, wherein said battery terminal case is slid upward relative to a battery holding portion, thereby defining an interval between said first and second terminals corresponding to an interval between respective terminals of the battery.

6. The electronic equipment according to claim 2, wherein said battery terminal case is drawn from said equipment casing in a horizontal direction relative to said casing, thereby defining an interval between said first and second terminals corresponding to an interval between respective terminals of the battery.

7. The electronic equipment according to claim 1, wherein in a state that said battery terminal case fitted to said equipment casing is housed in said equipment casing, said battery is connected at the exterior of said equipment casing.

8. The electronic equipment according to claim 1, wherein said battery terminal case is connected to the equipment casing by a supporting arm arranged so as to be drawn from said equipment casing, and wherein said supporting arm has a tip end having a projection portion for preventing said battery terminal case from being detached in a state that said battery terminal case is drawn from said equipment casing.

9. The electronic equipment according to claim 1, wherein said battery terminal case is mounted to be rotated in a horizontal direction relative to said equipment casing.

10. The electronic equipment according to claim 1, wherein said battery terminal case is mounted to be moved in a direction in which said battery terminal case is brought close to and away from a surface of said equipment casing where said battery terminal is provided.

11. The electronic equipment according to claim 1, wherein when the battery is housed in the interior of said equipment casing, said battery terminal case is rotated and then engaged with a lower surface side of the equipment casing.

* * * * *